United States Patent [19]

Tajima et al.

[11] Patent Number: 5,079,317

[45] Date of Patent: Jan. 7, 1992

[54] PROCESS FOR PRODUCING POLYETHYLENES

[75] Inventors: Yoshino Tajima, Kawasaki; Kazutoshi Nomiyama, Akishima; Nobuyuki Kuroda, Yokohama; Kazuo Matsuura, Tokyo, all of Japan

[73] Assignee: Nippon Oil Co., Ltd., Japan

[21] Appl. No.: 420,556

[22] Filed: Oct. 11, 1989

[30] Foreign Application Priority Data

Oct. 13, 1988 [JP] Japan .................................. 63-258063

[51] Int. Cl.$^5$ .......................... C08F 4/24; C08F 4/52
[52] U.S. Cl. ..................................... 526/106; 526/129; 526/151; 526/156; 526/186; 502/132; 502/238; 502/256; 502/320
[58] Field of Search ............... 526/106, 105, 129, 151, 526/156, 186; 502/132, 238, 256, 320

[56] References Cited

U.S. PATENT DOCUMENTS 4,189,402 2/1980 Rekers et al. ..................... 526/106

Primary Examiner—Joseph L. Schofer
Assistant Examiner—Tom Weber
Attorney, Agent, or Firm—Bruce L. Adams; Van C. Wilks

[57] ABSTRACT

A process for producing polyethylene is disclosed in which ethylene is polymerized in the presence of a composite catalyst. The catalyst is made up of a solid catalyst component typified by a selected chromium compound, a modified aluminum compound typified by a trialkylaluminum and an $R_n^1Al(OR^2)_{3-n}$ compound wherein $R^1$ and $R^2$ are represented by selected hydrocarbon groups and n by $0 \leq n \leq 3$. The polymer has improved melt index, flow parameter and melt tension characteristics.

13 Claims, No Drawings

PROCESS FOR PRODUCING POLYETHYLENES

BACKGROUND OF THE INVENTION

1. Technical Field

This invention relates to a process for the production of ethylene homopolymers or copolymers of improved moldability characteristics with the use of a composite catalyst of specified compositions.

2. Prior Art

It is known that ethylene can be homo- or co-polymerized in the presence of Phillips type catalysts having chromium oxide supported on silica or the like. In general, this type of catalyst is subject to activation only under elevated temperature and pressure conditions and also susceptible to malfunction even on contact with a limited amount of impurities which will be present in ethylene monomers, α-olefin comonomers or solvents used. The Phillips catalyst has a further drawback in that it involves prolonged induction period and hence reduced production rate.

To cope with the above problems, a certain process of polymerization has been proposed in which a chromium oxide catalyst supported is employed in combination with a small amount of a reaction product of an organoaluminum compound with water as disclosed in Japanese Patent Publication No. 49-7341. Given a minimum induction period, however, this process is required to be effected in the presence of a chromium oxide catalyst calcined at high temperature and at a polymerization temperature not lower than 100° C. so as to produce polyethylenes of great melt indices. To regulate the molecular weight of a polymer to be formed, the last-mentioned process is necessarily dependent upon the temperature of reaction rather than the feed of hydrogen. This mode of molecular weight control is difficult to accomplish with reliability. Such prior process is not wholly satisfactory in respect of the efficiency of operation.

A keen demand has been voiced for polyethylenes of superior melting and molding properties particularly in an industrial sector in which bottles of small dimensions are blow-molded for instance for daily use detergents.

SUMMARY OF THE INVENTION

The present invention seeks to provide an improved process for producing ethylene homopolymers or copolymers which will exhibit increased catalytic activity, minimized induction period and simplified molecular weight regulation and further have freedom from residual catalyst removal.

Polymers obtainable by the invention are wide in molecular weight distribution and superior in melt index and melt tension and thus highly moldable by blowing or by injection.

As will become better understood from the following description, the invention provides a process for producing ethylene homopolymers or copolymers which comprises homopolymerizing ethylene or copolymerizing the same with an α-olefin of from 3 to 12 carbon atoms in the presence of a composite catalyst comprising (I) a solid catalyst component containing a chromium oxide or a chromium compound capable of partially forming a chromium oxide upon calcination and supported on an inorganic oxide carrier and subsequently calcined, (II) a modified aluminum compound resulting from reaction of an organoaluminum compound with water and having one or more Al-O-Al bonds in the molecule and (III) a compound of the formula $R_n{}^1Al(OR^2)_{3-n}$ where $R^1$ and $R^2$ each are hydrocarbon groups of from 1 to 18 carbon atoms, $R^1$ and $R^2$ being the same or different, and n is $0 \leq n \leq 3$.

DETAILED DESCRIPTION OF THE INVENTION

Composite catalysts used for purposes of the present invention are comprised essentially of a solid catalyst component (component I), a modified organoaluminum compound (component II) and a compound of the formula $R_n{}^1Al(OR^2)_{3-n}$.

Component I may be obtained by supporting on an inorganic oxide carrier a chromium oxide or a chromium compound which, when calcined, is converted partially to a chromium oxide. Chromium compounds may be selected from chromium halides, chromium oxyhalides, chromium nitrate salts, chromium acetate salts, chromium sulfate salts, chromium alcoholates and the like. In specific examples of component I are included chromium trioxide, chromyl chloride, potassium bichromate, ammonium chromate, chromium nitrate, chromium acetate, chromium acetylacetate, di-tert-butyl chromate and the like.

Carriers include for example silica, alumina, silica-alumina, titania, silica-titania, zirconia and tria and mixtures thereof. Silica, silica-alumina and silica-titania are particularly preferred. The carrier should preferably have a surface area of 50 to 1,000 m²/g and a pore volume of 0.5 to 2.5 cm²/g.

As means for supporting component I on the carrier, there may be utilized impregnation, solvent distillation, sublimation or the like commonly accepted in the art. Component I should be supported in an amount of 0.1 to 10% by weight in terms of Cr, preferably 0.3 to 5%, more preferably 0.5 to 3%, based on the weight of the carrier.

Component I is calcined to activate generally in a moisture-free, non-reductive atmosphere for example in an oxygen stream, in an inert gas stream or in vacuo. Fully dried air may conveniently be used to this end in a fluidized state. Calcination conditions are at a temperature higher than 400° C., preferably between 500° and 900° C., and for a length of time from several minutes to tens of hours, preferably 30 minutes to 10 hours. Component I may if necessary be adjusted in its catalytic activity in conventional fashion by the addition of a titanate or a fluorine-containing salt at the time of support or calcination.

Component II includes reaction products resulting from reacting an organoaluminum component with water and having in the molecule an Al—O—Al bond in the number of 1 to 100, preferably 1 to 50. Reaction may be performed usually in an inert hydrocarbon selected from an aliphatic hydrocarbon such as pentane, hexane, heptane or the like, an alicyclic hydrocarbon such as cyclohexane, methylcyclohexane or the like, or an aromatic hydrocarbon such as benzene, toluene, xylene or the like. Preferred among these hydrocarbons are aliphatic and alicyclic types.

Organoaluminum compounds used herein are represented by the formula $R_nAlX_{3-n}$ where R is a hydrocarbon group of a carbon number of 1 to 18, preferably 1 to 12, such as an alkyl, alkenyl, aryl, aralkyl or similar group, X is a hydrogen or halogen atom, and n is $0 < n \leq 3$. Trialkylaluminums are particularly preferred in which the alkyl group may be chosen from methyl, ethyl, propyl, iso-propyl, butyl, iso-butyl, pentyl, hexyl, octyl, decyl, dodecyl or the like among which an iso-butyl group is typified.

The molar ratio of water to organoaluminum compound should be in the range of 0.25:1 to 1.2:1 in terms of $H_2O:Al$, preferably 0.5:1 to 1:1. Reaction conditions are at a temperature of $-70°$ to $100°$ C., preferably $-70°$ to $20°$ C., and for a length of time of 5 to 100 minutes, preferably 10 to 30 minutes.

Component III is one compound of the formula $R_n^1(OR^2)_{3-n}$ where $R^1$ and $R^2$ each are hydrocarbon groups of a carbon number of 1 to 18, preferably 1 to 12, $R^1$ and $R^2$ being the same or different, and n is $0 \leq n \leq 3$, preferably $0 < n < 3$. Hydrocarbon groups may be selected from alkyl, alkenyl, aryl, aralkyl, alicyclic and similar groups in which are included methyl, ethyl, n-propyl, iso-propyl, iso-butyl, hexyl, 2-methylpentyl, octyl, decyl, dodecyl, cyclohexyl, cyclohexylmethyl, phenyl, naphthyl, benzyl and the like. Particularly preferred are iso-propyl, iso-butyl and 2-ethylhexyl groups.

Specific examples of component III include $(C_2H_5)_2AlOC_2H_5$, $C_2H_5Al(OC_2H_5)_2$, $Al(OC_2H_5)_3$, $(C_2H_5)_2AlO$-iso-$C_3H_7$, $C_2H_5Al(O$-iso-$C_3H_7)_2$m $Al(O$-iso-$C_3H_7)_3$, (iso-$C_4H_9)_2AlOC_2H_5$, (iso-$C_4H_9)_2AlO$-iso-$C_3H_7$, iso-$C_4H_9Al(OC_2H_5)_2$, iso-$C_4H_9Al(O$-iso-$C_3H_7)_2$, (n-$C_6H_{11})_2AlOC_2H_5$, (n-$C_6H_{11})_2AlO$-iso-$C_3H_7$, n-$C_6H_{11}Al(OC_2H_5)_2$, (n-$C_6H_{11})_2AlO$-iso-$C_4H_7$, $Al(O$-sec-$C_4H_9)_3$, $(C_2H_5)_2Al(OC_6H_5)$ and the like. Most typically chosen are (iso-$C_4H_9)_2AlO$-iso-$C_3H_7$ and (iso-$C_4H_9)_2AlO$-n-$C_4H_9$ compounds.

Component III may be synthesized in known manner for instance by reacting an organoaluminum compound with an $R^2OH$ compound, or by reacting two different organoaluminum compounds of $R_3^1Al$ and $Al(OR^2)_3$ where $R^1$ and $R^2$ are as defined above. The first-mentioned reaction may more preferably be employed in which $R_3^1Al$ and $R^2OH$ compounds are reacted, and in this instance an iso-butyl group is preferred as $R^1$ and an iso-propyl or 2-ethylhexyl group as $R^2$. Reaction is effected usually in an inert hydrocarbon selected from an aliphatic hydrocarbon such as pentane, hexane, heptane or the like, an alicyclic hydrocarbon such as cyclohexane, methylcyclohexane or the like, or an aromatic hydrocarbon such as benzene, toluene, xylene or the like, and preferably in an aliphatic or alicyclic hydrocarbon. The molar ratio of $R^2OH$ compound to organoaluminum compound should be in the range of 0.25:1 to 3:1 in terms of $R^2OH:Al$, preferably 0.5:1 to 2:1, the reaction temperature in the range of $-70°$ to $100°$ C., preferably $-20°$ to $50°$ C., and the reaction time in the range of 5 to 100 minutes, preferably 10 to 60 minutes.

The atomic ratio of component I to components II and III should range from 0.01 to 1,000 in terms of Al:Cr, preferably 0.1 to 500, more preferably 1 to 100, and the molar ratio of component II to component III from 0.01 to 100, preferably 1 to 20. Departures from the above specified ratios would make the finished catalyst less active, resulting in a polymer of deteriorated quality.

The higher temperature while in calcination of component I, the greater melt index the resulting polymer has. The catalyst according to the invention has now been found highly capable, on calcination of component I even at a relatively low temperature, say about 500° C., of producing polymers of sufficient melt indices. This is interpreted to mean that such catalyst is distinguished in nature from the Phillips catalysts noted above.

In the practice of the process contemplated under the invention, the catalyst may be incorporated into the reaction system by either one of the following sequences.

a) Separate addition of individual components I, II and III.

b) Contact of components II and III and subsequent addition independently of component I.

c) Contact of components I and II and subsequent addition independently of component III.

d) Contact of components I and III and subsequent addition independently of component II.

e) Admixing components II and III and subsequent contact with component I prior to addition.

The last sequence e) is most preferred. In all the cases components II and III are dissolved in an aliphatic, alicyclic or aromatic hydrocarbon solvent such as pentane, hexane, heptane, cyclohexane, methylcyclohexane, benzene, toluene, xylene or the like. Typified is an aliphatic or alicyclic hydrocarbon solvent.

According to the process of the invention, ethylene is homopolymerized or copolymerized with a given comonomer. In examples of suitable comonomers are included $\alpha$-olefins of a carbon number of 3 to 12, preferably 3 to 6, such as propylene, 1-butene, 1-pentene, 4-metylpentene-1, 1-hexene and the like. The content of a polyolefin other than polyethylene should not exceed 10% by mol in the final copolymer.

The process of the invention is designed to suit slurry, solution and gas phase polymerizations among which slurry and gas phase modes of reaction are typified. Gas phase polymerization is particularly preferred which is accomplished in a substantially oxygen-free, water-free state and in the presence of or in the absence of an inert solvent. Suitable solvents may be chosen from aliphatic hydrocarbons such as hexane, heptane and the like, alicyclic hydrocarbons such as cyclohexane, methylcyclohexane and like and aromatic hydrocarbons such as benzene, toluene, xylene and the like. Polymerization conditions are at a temperature of 20° to 200° C., preferably 50° to 100° C., at a pressure of atmospheric to 70 kg/cm2G, preferably atmospheric to 20 kg/cm2G, and for a length of time of 5 minutes to 10 hours, preferably 5 minutes to 5 hours. These conditions should strictly be observed to preclude prolonged time of reaction and increased polymer of low molecular weight.

The molecular weight of a polymer to be formed may be controlled by feeding a predetermined amount of hydrogen into the reaction system. With efficiency and accuracy in view, it is more preferable to use hydrogen than varying the polymerization temperature or catalyst proportion. It has also been found that the catalyst according to the invention is acceleratively activable on contact with the hydrogen charged, whereby molecular weight regulation and catalytic activity buildup are concurrently attainable. The catalyst may be pretreated with hydrogen, where desired, at from 25° to 100° C. and at from 0.5 to 10 kg/cm2G for from 10 to 60 minutes.

The invention will be further described by way of the following examples which are provided for purposes of illustration only.

TEST METHODS

Different polyethylenes provided in the examples were examined for melt index, flow parameter and melt tension under the conditions given below and with the results tabulated below.

Melt Index (MI)

ASTM D-1238-57T was followed with temperature: 190° C. and loads: 2.16 kg, $MI^{2.16}$, and 21.6 kg, $MI^{21.6}$.

Flow Parameter (FP)

Flowability was determined from the equation, log $MI^{21.6}/MI^{2.16}$. The larger numerical value, the wider the molecualr weight distribution.

Melt Tension (MT)

On a melt tension tester (Toyo Seki Co.) the polymer melted at 190° C. in a cylinder (inside diameter: 9.55 mm) was extruded into a stranded form at a piston descent speed of 20 mm/min through an orifice (aperture: 2.10 mm, length 8.00 mm), followed by take-up on to a roll (outside diameter: 5.0 cm). Melt tension was expressed by the stress (g) required for the strand to be rolled at 100 rpm. In the case of scission prior to arrival at 100 rpm, the stress was determined at that time.

Preparation of Catalyst Components

Catalyst Component A

Twenty (20) grams of silica (Grade 952, Fuji-Davison Co.) was vacuum-dried at 300° C. for 3 hours and then immersed in a solution of 0.8 g of chromium trioxide in 100 ml of pure water. The mixture was stirred at room temperature for one hour, followed by removal of water at 120° C. in a nitrogen atmosphere and by vacuum drying at 120° C. for 10 hours. Calcination was effected at 500° C. for 5 hours in a fluidized bed and in an oxygen stream after which a catalyst component was provided. The component was stored in a nitrogen atmosphere.

Catalyst Component B

The method for Catalyst Component A was followed except that the calcination temperature was elevated to 800° C.

Catalyst Component C

The method for Catalyst Component A was followed except that 1.9 g of chromium acetate was used in place of chromium trioxide and that calcination was done at 600° C.

Catalyst Component D

The same amount of the same silica as in Catalyst Component A was vacuum-dried at 300° C. for 3 hours and put into a 300-ml three-neck flask, followed by addition of 150 ml of anhydrous hexane and then 0.9 g of tert-butyl chromate. The mixture was stirred at room temperature for one hour, and excess hexane was removed at 80° C. in a nitrogen atmosphere. Vacuum drying was thereafter done at 80° C. and calcination at 600° C. for 5 hours in a fluidized bed with dry air being streamed. The resulting catalyst component was stored in a nitrogen atmosphere.

Preparation of Modified Aluminum Compound

To 50 ml of a solution of tri-iso-butylaluminum (1 mmol/ml) in hexane was added with ice cooling a total ot 0.9 ml of nitrogen-blown, oxygen-purged, purified water ($H_2O$:Al=1:1), every 20 µl, over 10 minutes. The resulting solution was reacted at room temperature for 30 minutes to thereby give a transparent, homogeneous hexane solution.

Preparation of $R_n{}^1Al(OR^2)_{3-n}$ Compound

An (iso-$C_4H_9$)$_2$AlO-iso-$C_3H_7$ compound was prepared in modified form. To 50 ml of a solution of tri-isobutylaluminum (1 mmol/ml) in hexane was added with ice cooling a total of 3.8 ml of anhydrous isopropanol (iso-$C_4H_9$:Al=1:1), every 20 µl, over 20 minutes. Subsequent reaction at room temperature for 30 minutes gave a transparent, homogeneous hexane solution.

EXAMPLE 1

A 3-liter stainless steel autoclave equipped with a stirrer was replaced with nitrogen and charged with 1,500 ml of hexane, 80 mg of Catalyst Component A, 1 mmol of a modified aluminum compound and 0.5 mmol of an $R_n{}^1Al(OR^2)_{3-n}$ compound, the latter two compounds having been prepared above. The mixture was heated with stirring at 80° C. so that the reaction system was raised to 1.5 kg/cm$^2$G with the vapor pressures of nitrogen and hexane. Hydrogen was fed at 4.3 kg/cm$^2$G and ethylene at a total pressure of 10 kg/cm$^2$G. Polymerization was initiated and continued for one hour with the total pressure maintained at 10 kg/cm$^2$G by a successive feed of ethylene. The reaction mixture after being purged of excess monomer was cooled and dried to obtain 171 g of polyethylene.

The polymer showed an MI of 0.36 g/10 min, an FP of 2.1 and an MT of 16 g.

EXAMPLES 2 and 3

The procedure of Example 1 was followed except that the amount of (iso-$C_4H_9$)$_2$AlO-iso-$C_3H_7$ was varied.

EXAMPLES 4 and 5

The procedure of Example 1 was followed except that hydrogen was charged in varied concentrations.

EXAMPLE 6

The procedure of Example 1 was followed except that Catalyst Component B was substituted for Catalyst Component A.

EXAMPLE 7

The procedure of Example 1 was followed except that Catalyst Component C was used.

EXAMPLE 8

The procedure of Example 1 was followed except that Catalyst Component D was used.

EXAMPLE 9

The procedure of Example 1 was followed except that Catalyst Component C was used and that the modified aluminum compound and (iso-$C_4H_7$)$_2$AlO-iso-$C_3H_7$ were added in varied amounts.

EXAMPLE 10

The procedure of Example 1 was followed except that the polymerization temperature was elevated to 90° C.

EXAMPLE 11

The procedure of Example 1 was followed except that (iso-$C_4H_9$)$_2$AlO-iso-$C_3H_7$ was replaced with a reaction product of Al($C_2H_5$)$_2$ and Al(O-sec-$C_4H_9$)$_3$.

EXAMPLE 12

The procedure of Example 1 was followed except that $(C_2H_5)_2AlOC_2H_5$ was used in place of (iso-$C_4H_9)_2AlO$-iso-$C_3H_7$.

EXAMPLE 13

The procedure of Example 1 was followed except that a reaction product of Al(iso-$C_4H_9)_3$ and tert-$C_4H_9OH$, (iso-$C_4H_9)_2AlO$-tert-$C_4H_9$, was substituted for (iso-$C_4H_9)_2AlO$-iso-$C_3H_7$.

EXAMPLE 14

The procedure of Example 1 was followed except that diethyl mono-2-ethylhexyloxyaluminum obtained by reacting $Al(C_2H_5)_2$ with 2-ethylhexanol was used in place of (iso-$C_4H_9)_2AlO$-iso-$C_3H_7$.

EXAMPLE 15

The procedure of Example 1 was followed except that (iso-$C_4H_9)_2AlO$-iso-$C_3H_7$ was replaced with $(C_2H_5)_2Al(OC_6H_5)$ derived by reacting $Al(C_2H_5)_3$ with phenol.

COMPARATIVE EXAMPLE 1

The procedure of Example 1 was followed except that the modified aluminum compound was omitted. Because the resulting polymer was negligibly small in MI, the FP quality was not determinable.

COMPARATIVE EXAMPLE 2

The procedure of Example 1 was followed except that the $R_n^1Al(OR^2)_{3-n}$ compound was omitted.

COMPARATIVE EXAMPLE 3

The procedure of Example 1 was followed except that unmodified Al(iso-$C_4H_9)_3$ was used and that the amount of (iso-$C_4H_9)_2AlO$-iso-$C_3H_7$ was halved. The polymer obtained was found too high in MI and hence impossible of MT measurement.

EXAMPLE 16

Catalyst Component A was contacted with (iso-$C_4H_9)_2Al(AlO$-iso-$C_3H_7$)at room temperature, followed by charge into the reaction system independently of the modified aluminum compound. Polymerization was carried out as was in Example 1, the details as regards the catalyst composition and polymer quality being tabulated.

EXAMPLE 17

Catalyst Component A was contacted with the modified aluminum compound at room temperature and then added to the system separately of (iso-$C_4H_9)_2AlO$-iso-$C_3H_7$.

EXAMPLE 18

The modified aluminum compound was admixed with the (iso-$C_4H_9)_2AlO$-iso-$C_3H_7$ compound at room temperature to thereby give a mixed solution with which Catalyst Component A was then contacted. The catalyst thus pretreated was charged into the system.

Example 19

The procedure of Example 18 was followed except that the amount of (iso-$C_4H_9)_2AlO$-iso-$C_3H_7$ was varied and that Catalyst Component D was substituted for Catalyst Component A.

TABLE

| run | | Catalyst component (I) type | Cr (wt %) | calcination temp (°C.) | amount (mg) | modified organo-aluminum (II) (mmol) | $R_n^1Al(OR^2)_{3-n}$ (III) (mmol) | II/III (mol ratio) |
|---|---|---|---|---|---|---|---|---|
| Example | 1 | A | 2 | 500 | 80 | 1 | 0.5 | 2 |
| | 2 | A | 2 | 500 | 80 | 1 | 0.25 | 4 |
| | 3 | A | 2 | 500 | 80 | 1 | 1 | 1 |
| | 4 | A | 2 | 500 | 80 | 1 | 0.5 | 2 |
| | 5 | A | 2 | 500 | 80 | 1 | 0.5 | 2 |
| | 6 | B | 2 | 800 | 80 | 1 | 0.5 | 2 |
| | 7 | C | 2 | 600 | 80 | 1 | 0.5 | 2 |
| | 8 | D | 1 | 600 | 80 | 1 | 0.5 | 2 |
| | 9 | C | 2 | 600 | 80 | 2 | 1 | 2 |
| | 10 | A | 2 | 500 | 80 | 1 | 0.5 | 2 |
| | 11 | A | 2 | 500 | 80 | 1 | 0.5 | 2 |
| | 12 | A | 2 | 500 | 80 | 1 | 0.5 | 2 |
| | 13 | A | 2 | 500 | 80 | 1 | 0.5 | 2 |
| | 14 | A | 2 | 500 | 80 | 1 | 0.5 | 2 |
| | 15 | A | 2 | 500 | 80 | 1 | 0.5 | 2 |
| Comparative Example | 1 | A | 2 | 500 | 80 | 1 | — | — |
| | 2 | A | 2 | 500 | 80 | 1 | 1 | — |
| | 3 | A | 2 | 500 | 80 | 1 (unmodified) | 0.25 | 4 |
| Example | 16 | A | 2 | 500 | 80 | 1 | 1 | 1 |
| | 17 | A | 2 | 500 | 80 | 1 | 1 | 1 |
| | 18 | A | 2 | 500 | 80 | 1 | 1 | 1 |
| | 19 | D | 1 | 600 | 80 | 1 | 0.5 | 2 |

| run | | Al/Cr (atomic ratio) | polymerization temp (°C.) | $H_2$ (vol %) | time (hr) | yield (g) | activity (g/g · catalyst · hr · pressure) | MI (g/10 min) | FP | MT (g) |
|---|---|---|---|---|---|---|---|---|---|---|
| Example | 1 | 49 | 80 | 50 | 1 | 103 | 300 | 0.36 | 2.1 | 16 |
| | 2 | 41 | 80 | 50 | 1 | 114 | 330 | 0.31 | 2.1 | 16 |
| | 3 | 65 | 80 | 50 | 1 | 110 | 320 | 0.29 | 2.1 | 18 |
| | 4 | 49 | 80 | 10 | 1 | 233 | 380 | 0.11 | 2.3 | 25 |
| | 5 | 49 | 80 | 25 | 1 | 184 | 360 | 0.20 | 2.2 | 19 |
| | 6 | 49 | 80 | 50 | 1 | 100 | 290 | 0.68 | 2.4 | 10 |
| | 7 | 49 | 80 | 50 | 1 | 120 | 350 | 0.53 | 2.2 | 12 |

TABLE -continued

|  |  |  |  |  |  |  |  |  |  |  |
|---|---|---|---|---|---|---|---|---|---|---|
|  | 8 | 49 | 80 | 50 | 1 | 124 | 360 | 0.50 | 2.2 | 13 |
|  | 9 | 98 | 80 | 50 | 1 | 127 | 370 | 0.50 | 2.2 | 13 |
|  | 10 | 49 | 90 | 50 | 1 | 120 | 350 | 0.72 | 2.0 | 10 |
|  | 11 | 49 | 80 | 50 | 1 | 86 | 250 | 0.40 | 2.3 | 14 |
|  | 12 | 49 | 80 | 50 | 1 | 68 | 200 | 0.31 | 2.5 | 16 |
|  | 13 | 49 | 80 | 50 | 1 | 103 | 300 | 0.29 | 2.2 | 18 |
|  | 14 | 49 | 80 | 50 | 1 | 96 | 280 | 0.32 | 2.2 | 16 |
|  | 15 | 49 | 80 | 50 | 1 | 82 | 240 | 1.43 | 2.2 | 14 |
| Comparative |  |  |  |  |  |  |  |  |  |  |
| Example | 1 | 49 | 80 | 50 | 1 | 93 | 270 | 0.001 | — | 70 |
|  | 2 | 49 | 80 | 50 | 1 | 21 | 60 | 0.10 | 2.4 | 20 |
|  | 3 | 41 | 80 | 50 | 1 | 30 | 75 | 10 | 2.6 | — |
| Example | 16 | 65 | 80 | 50 | 1 | 50 | 150 | 0.51 | 2.0 | 13 |
|  | 17 | 65 | 80 | 50 | 1 | 60 | 180 | 0.05 | 2.4 | 35 |
|  | 18 | 65 | 80 | 50 | 1 | 131 | 390 | 0.30 | 2.2 | 18 |
|  | 19 | 49 | 80 | 50 | 1 | 134 | 400 | 0.48 | 2.2 | 13 |

What is claimed is:

1. A process for producing ethylene homopolymers or copolymers which comprises homopolymerizing ethylene or copolymerizing the same with an α-olefin of 3 to 12 carbon atoms in the presence of a composite catalyst comprising:
   (I) a solid catalyst component containing a chromium oxide or a chromium compound capable of partially forming a chromium oxide upon calcination and supported on an inorganic oxide carrier and subsequently calcined;
   (II) a modified aluminum compound resulting from reaction of an organoaluminum compound with water and having one or more Al—O—Al bonds in the molecule; and
   (III) a compound of the formula $R_n{}^1Al(OR^2)_{3-n}$ where $R^1$ and $R^2$ each are hydrocarbon groups of from 1 to 18 carbon atoms, $R^1$ and $R^2$ being the same or different, and n is $0 \leq n < 3$.

2. The process of claim 1 wherein said catalyst component is selected from the group consisting of chromium trioxide, chromyl chloride, potassium bichromate, ammonium chromate, chromium nitrate, chromium acetate, chromium acetyl acetate and di-tert-butyl chromate.

3. The process of claim 1 wherein said carrier is selected from the group consisting of silica, alumina, silica-alumina, titania, silica-titania, zirconia, tria and combinations thereof.

4. The process of claim 1 wherein said organoaluminum compound is represented by the formula $R_nAlX_{3-n}$ where R is a hydrocarbon group of from 1 to 18 carbon atoms, X is a hydrogen or halogen atom, and n is $0 < n \leq 3$.

5. The process of claim 4 wherein said organoaluminum compound is a trialkylaluminum in which the alkyl group is selected from the group consisting of methyl, ethyl, propyl, iso-propyl, butyl, iso-butyl, pentyl, hexyl, octyl, decyl and dodecyl.

6. The process of claim 1 wherein said compound of $R_n{}^1Al(OR^2)_{3-n}$ is selected from the group consisting of $(C_2H_5)_2AlOC_2H_5$, $C_2H_5Al(OC_2H_5)_2$, $Al(OC_2H_5)_3$, $(C_2H_5)_2AlO\text{-iso-}C_3H_7$, $C_2H_5Al(O\text{-iso-}C_3H_7)_2$, $Al(O\text{-iso-}C_3H_7)_3$, $(\text{iso-}C_4H_9)_2AlOC_2H_5$, $(\text{iso-}C_4H_9)_2AlO\text{-iso-}C_3H_7$, $\text{iso-}C_4H_9Al(OC_2H_5)_2$, $\text{iso-}C_4H_9Al(O\text{-iso-}C_3H_7)_2$, $(\text{n-}C_6H_{11})_2AlOC_2H_5$, $(\text{n-}C_6H_{11})_2AlO\text{-iso-}C_3H_7$, $\text{n-}C_6H_{11}Al(OC_2H_5)_2$, $(\text{n-}C_6H_{11})_2AlO\text{-iso-}C_4H_7$, $Al(O\text{-sec-}C_4H_9)_3$ and $(C_2H_5)_2Al(OC_6H_5)$.

7. The process of claim 1 wherein the atomic ratio of component I to components II and III is in the range of from 0.01 to 1,000 in terms of Al:Cr.

8. The process of claim 1 wherein the molar ratio of component II and component III is in the range of from 0.01 to 100.

9. The process of claim 1 wherein either two or all of components I to III are contacted prior to incorporation into the reaction system.

10. The process of claim 1 wherein said α-olefin is selected from the group consisting of propylene, 1-butene, 1-pentene, 4-methylpentene-1 and 1-hexene.

11. The process of claim 1 wherein the polymerization is effected in the presence of or in the absence of an inert hydrocarbon solvent.

12. The process of claim 11 wherein said solvent is selected from the group consisting of pentane, hexane, heptane, cyclohexane, methylcyclohexane, benzene, toluene and xylene.

13. The process of claim 11 wherein the polymerization reaction is effected at from 20° to 100° C. and at from atmospheric pressure to 70 kg/cm²G for from 5 minutes to 10 hours.

* * * * *